(12) United States Patent
Chen et al.

(10) Patent No.: US 11,494,328 B2
(45) Date of Patent: Nov. 8, 2022

(54) TRANSMITTING UNIT, RECEIVING UNIT, ACTIVE TRANSMISSION DEVICE AND ACTIVE TRANSMISSION SYSTEM SUITABLE FOR USB SIGNALS

(71) Applicant: EverPro (Wuhan) Technologies Company Limited., Wuhan (CN)

(72) Inventors: Ting Chen, Beijing (CN); Hui Jiang, Beijing (CN); Xinliang Zhou, Beijing (CN); Yan Li, Beijing (CN); Yufeng Cheng, Beijing (CN)

(73) Assignee: EVERPRO (WUHAN) TECHNOLOGIES COMPANY LIMITED, Wuhan (CN)

(*) Notice: Subject to any disclaimer, the term of this patent is extended or adjusted under 35 U.S.C. 154(b) by 0 days.

(21) Appl. No.: 17/654,008

(22) Filed: Mar. 8, 2022

(65) Prior Publication Data
US 2022/0292038 A1    Sep. 15, 2022

(30) Foreign Application Priority Data
Mar. 9, 2021 (CN) .......................... 202110255995.6

(51) Int. Cl.
*H04B 1/18* (2006.01)
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01); *H04B 1/18* (2013.01)

(58) Field of Classification Search
CPC ... H04B 3/00; H04B 3/02; H04B 3/50; H04B 1/18; G06F 13/382; G06F 13/428; G06F 2213/0042
See application file for complete search history.

(56) References Cited

U.S. PATENT DOCUMENTS

| 8,255,582 B2 | 8/2012 | Wong et al. |
| 2014/0075247 A1 | 3/2014 | Lin et al. |

(Continued)

FOREIGN PATENT DOCUMENTS

| CN | 102315881 | 1/2012 |
| CN | 110113070 | 8/2019 |
| CN | 112084736 | 12/2020 |

OTHER PUBLICATIONS

Office Action from related Chinese Appln. No 202110255995.6, dated Nov. 22, 2021. English translation attached.

(Continued)

*Primary Examiner* — David S Huang
(74) *Attorney, Agent, or Firm* — Grossman, Tucker, Perreault & Pfleger, PLLC

(57) ABSTRACT

A transmission unit, receiving unit, active transmission device and active transmission system applicable to USB signal, and is used for addressing the problem that the ping.LFPS signal is easy to lose; setting a detection threshold value to distinguish ping.LFPS signals from other LFPS signals to ensure that no ping.LFPS signals are missed; optimizing the USB3.X signal with a proxy module to generate proxy signals for ping.LFPS signals and other LFPS signals respectively; supporting and managing the Link training to improve the success rate of high-speed signal transmission by modifying circuit configuration and re-training.

14 Claims, 2 Drawing Sheets

(56) References Cited

U.S. PATENT DOCUMENTS

2017/0017604 A1* 1/2017 Chen .................. G06F 11/3027
2022/0109470 A1* 4/2022 Tamaki ................ H04B 5/0031

OTHER PUBLICATIONS

Notice to Grant from related Chinese Appln. No. 202110255995.6, dated Jan. 17, 2022. English translation attached.

* cited by examiner

TRANSMITTING UNIT, RECEIVING UNIT, ACTIVE TRANSMISSION DEVICE AND ACTIVE TRANSMISSION SYSTEM SUITABLE FOR USB SIGNALS

CROSS-REFERENCE TO RELATED APPLICATIONS

This application claims priority to Chinese Application No. 202110255995.6 filed with China National Intellectual Property Administration on Mar. 9, 2021, the entire contents of which are incorporated herein by reference.

FIELD

This Application relates to a USB data transmission method, and in particularly, for transmission and receiving units and active transmission system for signal transmission protocols of USB3.0 and the above.

BACKGROUND

With the update of USB protocols and the increase of the transmission rates, the pure copper wire are unable to support long distance transmission with high speed due to its attenuation characteristics, making active cables an increasingly important transmission method.

The current active cable transmission method has proposed many solutions, including re-driver solutions, re-timer solutions and pure optical transmission solutions.

All of the above solutions need to address the issue of high-speed signal quality. In addition, USB differs from other protocols by not providing a separate channel for system status checks and transmission of LFPS signals. That is, not only the high-speed signal but also the low-speed signal (20 Mbps-100 Mbps), the idle signal (in idle state) and the switching among the three are transmitted on the high-speed channel. After USB 3.1, LFPS signal still carries information, so the transmission also tries to keep the duration of low speed signal and the idle signal unchanged. Also, there is a signal in the LFPS signal called ping.LFPS signal, which is characterized by a particularly long idle time and a particularly short time with AC signal (40 ns-200 ns). It is also a challenge for the active cable transmission solution, in particular for the active optical cable transmission solutions using optical as the medium.

The prior art for the transmission of LFPS signals in USB mainly includes two categories. One is the direct transmission, taking the active optical cable with optical medium as an example, the received electric signal is directly converted into optical signal, and then the optical signal is directly converted into the electric signal for transmission. This type of transmission does not change the frequency of the signal, but requires the optical driving and receiving devices to support low speed signals. The other is proxy transmission, which means that the LFPS signal is detected and instead of transmitting the received signal directly, the circuit generates another LFPS signal of its own, replacing the original LFPS signal for transmission.

The advantage of direct transmission is that the circuit structure is relatively simple, and that the frequency of the original signal is maintained. However, referring to FIG. 1, with direct transmission, detection and circuit transition times are required from no signal to active signal and vice versa, which may cause the circuit to miss part of the signal at the beginning, and the transmission of the LFPS signal may cause an incomplete signal cycle at the beginning and an abnormal signal at the end, which is often referred to as noise, glitch, tail, etc. Such LFPS signals with abnormal start and end are not compliant with USB protocol, and may interfere with the signal detection of the receiving unit, causing compatibility problems with the system.

There are many ways to implement proxy transmission, and the common advantage is that the output LFPS signal is ensured to comply with the requirements of USB protocol, while the disadvantage is that the time for detecting and processing the signal becomes longer, resulting in the missing transmission of the ping.LFPS signal. Moreover, some proxy solutions may cause changes to the duration or proportion of the low-speed signal and the idle signal in the LFPS signal, leading to poor recognition of the signals carried on the LFPS signal.

In addition, the most important thing for high-speed signal transmission is to ensure the signal quality, and the USB protocol provides for a Link training phase to realize link adjustment. However, the link training of the USB protocol is unidirectional and no feedback mechanism is available. For conventional active cables, if there is no re-timer circuit, the management of the link training phase is often abandoned, and transmission is simply performed with a fixed settings. This method has two disadvantages, one is that the performance does not change with the system and is not optimal at the moment; the other is that the power consumption of different settings is different, which may result in the cable transmitting 5 Gbps signal with the same high performance configuration as that of transmitting 10 Gbps signal, which is not conducive to the purpose of energy saving. In addition, the USB protocol does not provide for a re-training mechanism if link training fails.

Therefore, how to adapt to the transmission of USB 3.0 and the above signals, in particular, for the optical transmission of LFPS signals, as well as the support and management of the Link training phase to realize a effective transmission of USB signals in the active transmission system including active cables, etc., has become an urgent technical problem to be addressed in the prior art.

SUMMARY

The purpose of this Application is to propose a transmission and receiving unit, an active transmission device and an active transmission system supporting signals of USB3.0 and the above. This Application can effectively address the challenges of the transmission of LFPS signal over active cables, in particular, of the optical transmission of LFPS signal, as well as the support and management of Link training phase.

To achieve this purpose, this Application adopts the following technical solution:

A transmission unit applicable for signals of USB3.0 and the above connected to a transmission medium for transmitting signals of USB3.0 and the above, comprising:

electrical input port, transmission unit LOSS detection module, transmission unit control module, and output circuit, wherein:

the electrical input port is used for receiving the input USB electric signal to be transmitted; and the transmission unit LOSS detection module is connected to the electrical input port, and is used for detecting whether there is an AC signal in the transmission path to be transmitted or the transmission path is in an idle state (i.e. no AC signal), and transmitting the result to the transmission unit control module; and the transmission unit control module is configured for controlling the output of the output circuit according to the state of the electrical input port, and determining the state of the transmission unit, wherein the transmission unit state includes outputting the component of an AC signal or maintaining only the DC component; and the output circuit is connected with the transmission medium, and is used for driving the output signal according to the command of the transmission unit control module, maintaining the AC component of the output signal and transmitting a signal if there is AC signals in the above electrical input port to be transmitted, or turning of the AC component of the output signal and maintaining only the DC component if there is no AC signal input, that is, in an idle state.

Optionally, the electrical input port is further provided with a termination matching circuit, and the termination matching circuit can provide a low resistance receiving unit termination (RRX-DC) complying with the requirements of USB protocol, or a high resistance receiving unit termination (ZRX-HIGH-IMP-DC-POS) complying with the requirements of the USB protocol.

Optionally, the transmission unit control module can receive the re-training decision from the receiving unit control module, and causing the transmission unit control module configuring the Rx termination of the Electrical input port first as a high-resistance receiving unit termination (ZRX-HIGH-IMP-DC-POS) complying with the requirements of the USB protocol, and then as a low-resistance receiving unit termination (RRX-DC) complying with the requirement of the USB protocol.

Optionally, the re-training decision may come from the re-training decision of the receiving unit control module of the same transmission data stream, or the re-training decision of the receiving unit control module of other transmission data streams located at the same end.

Optionally, the workflow of the transmission unit is as follows:

the transmission unit LOSS detection module detects whether there is an AC signal in the transmission path to be transmitted, or the transmission path is in an idle state (i.e., no AC signal), and transmits the result to the transmission unit control module; and the transmission unit control module is configured for controlling the output of the output circuit according to the state of the electrical input port and determining the state of the transmission unit, wherein the transmission unit state includes outputting the component of an AC signal or maintaining only the DC component; and the output circuit drives the output signal according to the command of the transmission unit control module, is used for maintaining the AC component of the output signal and transmitting a signal if there is AC signal in the electrical input port to be transmitted, or turning off the AC component of the output signal and maintaining only the DC component if there is no AC signal input, that is, in an idle state.

This Application also discloses a receiving unit applicable for signals of USB3.0 and above, and is connected to a transmission medium for receiving signals of USB3.0 and the above, comprising:

input circuit, receiving unit LOSS detection module, receiving unit control module, signal type detection module, proxy module, electrical output port, the input circuit is connected to the other end of the above transmission medium, and is used for receiving the signal output by the transmission unit; and the receiving unit LOSS detection module is connected with the input circuit, and is used for detecting whether the there is an AC signal in the input circuit or the input circuit is in an idle state, and transmitting the result to the receiving unit control module; and the signal type detection module is connected with the input circuit, and is used for detecting whether the AC signal input by the above input circuit is a high speed signal, ping.LFPS signal or some other LFPS signal when there is an AC signal, and transmitting the result to the receiving unit control module; and the receiving unit control module is configured to control the operating modes of the electrical output port and the proxy module according to the state of the input circuit to determine the state of the receiving unit, wherein the receiving unit state includes Gen1 mode, Gen2 mode and other corresponding configurations; and the proxy module is connected with the receiving unit control module to enable the generation of a low speed signal complying with the USB protocol, and is used for generating a ping.LFPS signal or other LFPS signals respectively according to the instruction when there is an LFPS signal, and connecting to the electrical output port for signal output; and the electrical output port is used for electrical signal output.

Optionally, the work flow of the receiving unit is as follows:

The receiving unit LOSS detection module is connected to the input circuit to detect whether there is an AC signal in the input circuit or the input circuit is in an idle state; and if there is an AC signal in the input circuit, the signal type detection module continues to detect whether the signal coming from the input circuit is a ping.LFPS signal, some other LFPS signal, or a high speed signal; and the receiving unit control module is capable of controlling the above electrical output port and operating modes of the proxy module and determining the state of the receiving unit according to the state of the input circuit, wherein the receiving unit state includes Gen1 mode, or Gen2 mode and other corresponding configurations; and the electrical output port is used to output the signals or turn off the output according to the command of the control module of the receiving unit: if there is no AC signal input in the input circuit, the electrical output port is turned off; if there is ping.LFPS input in the input circuit, the electrical output port is connected to the proxy module to output the ping.LFPS signal generated by the proxy module; if there is other LFPS signal inputs other than ping.LFPS in the input circuit, the electrical output port is connected to the proxy module to output other LFPS signals generated by the proxy module; if there is high-speed signal input in the input circuit, the electrical output port outputs the high-speed signal directly after amplification and other operations.

Optionally, the time threshold set in the signal type detection module is between 200-300 ns.

Optionally, the time threshold is 250 ns.

Optionally, the ping.LFPS signal generated by the above proxy module has a fixed length ping.LFPS signal complying with the USB protocol, and the other LFPS signals are LFPS signals with a burst duration (tBurst) and a repetition time (tRepeat) substantially equal to the length of the input signal.

Optionally, after the active transmission device is powered on, the receiving unit control module analyzes the input signal, if the signal is found that the current system transmits signal USB3.0 or Gen1 signal of USB3.1/USB3.2, the receiving unit control module adopts the transmission mode A setting for the receiving unit circuit to enter into transmission mode A; if the signal is found that the current system transmits Gen2 signal of USB3.1/USB3.2, the receiving unit control module adopts the setting of transmission mode B setting for the receiving unit circuit to enter into transmission mode B.

Optionally, the receiving unit control module determines whether link training has failed, and if the link training has failed, the receiving unit control module initiates a re-training operation.

Optionally, the receiving unit control module determines whether the link training has failed: the USB3.X connection has not been established, or it should have been Gen2 but decelerated to Gen1; and the receiving unit control module is able to initiate a re-training operation by one or more of the following methods:

the receiving unit control module transmits the decision of re-training to the transmission unit control module, and causing the transmission unit control module configuring the Rx termination of the electrical input port first as a high impedance receiving unit termination (ZRX-HIGH-IMP-DC-POS) complying with the requirements of the USB protocol, and then as a low resistance receiving unit termination (RRX-DC) complying with the requirements of the USB protocol, or the receiving unit control module controls the power supply for the power cable (VBUS) of the plug where the unit is located to power off and then power on again, or the reset operation needs to be applied to the first plug and/or the second plug of the active transmission device where the control module of the receiving unit is located.

Optionally, the failure to establish a USB3.X connection may be determined by one or more of the following: a LFPS signal is found to have exceeded its time and still not been successfully handshaken, and the transmission of TSEQ has not been performed all the time, or the transmission of the high-speed signal has ended abnormally by being shorter than the minimum transmission length specified in the USB protocol; and the judgment should be made by using the information carried by the LFPS signal when Gen2 is decelerated to Gen1, or by performing rate detection on a high speed signal.

Optionally, the transmission unit control module that is notified by the re-training decision of the receiving unit control module may be a transmission unit control module of the same transmission data stream, or a transmission unit control module of other transmission data streams located at the same end.

Optionally, the reset operation methods include: performing the reset operation by controlling a power supply, performing the reset operation by a reset pin, performing the reset operation by writing registers, or performing the reset operation by reloading firm wares, etc.; and the circuits to be reset in the reset operation of the first and second plugs of the active transmission device in which the receiving unit control module is located are either all of the circuits of the first and second plugs, or part of the relevant circuits of the first and second plugs.

This Application further discloses an active transmission device applicable for signals of USB3.0 and above, comprising:

a transmission unit and a receiving unit in any of the preceding paragraphs, and a transmission medium connecting the transmission unit and the receiving unit.

This Application also discloses a bidirectional active transmission system of USB signals, wherein:

a first plug and a second plug are provided, and the first plug is provided with a transmission unit and a receiving unit as described in this Application, and the second plug is also correspondingly provided with a transmission unit and a receiving unit as described in this Application, and a corresponding transmission medium is provided between the first plug and the second plug, enabling both the first plug and the second plug have the function of transmitting and receiving.

Optionally, the transmission unit control module and the receiving unit control module located in the same plug can be realized by the same MCU, or by two separate MCUs that are capable of communicating with each other.

Optionally, in re-training, the receiving unit control module of a certain plug is able to notify the related re-training information selectively to the transmission unit control module of the same plug, and the transmission unit control module of the same plug is able to select whether to perform re-training based on the information by configuring the Rx termination of the electrical input port first as a high resistance receiving unit termination (ZRX-HIGH-IMP-DC-POS) complying with the requirements of USB protocol, and then as a low resistance receiving unit termination (RRX-DC) complying with the requirements of USB protocol.

Optionally, the receiving unit control module of a certain plug can notify the transmission unit control module of the same plug of relevant information selectively after confirming the transmission rate of the current system, and the transmission unit control module adopts the setting of transmission mode A for the transmission unit circuit to enter transmission mode A, or adopts the setting of transmission mode B for the transmission unit circuit to enter transmission mode B based on this information.

In summary, this Application is of the advantages as following:

1. It is applicable for the transmission of LFPS signal in USB3.X signal transmission, in particular, for the optical transmission of LFPS signal. It can avoid the loss of the control signal transmission in USB signal transmission and mis-transmission of the control signal information in the transmission of higher version of USB signal;

2. A detection threshold can be set for addressing the issue that the ping.LFPS signal is easy to lose, and distinguishing the ping.LFPS signals in the LFPS signals from other LFPS signals to ensure that no ping.LFPS signal is missed;

3. The proxy module is optimized for USB3.X signal, generating separate proxy signals for the ping.LFPS signal and other LFPS signals;

4. Link training is supported and can be managed to improve the success rate of high-speed signal transmission by modifying circuit configuration and re-training.

Figure 1:
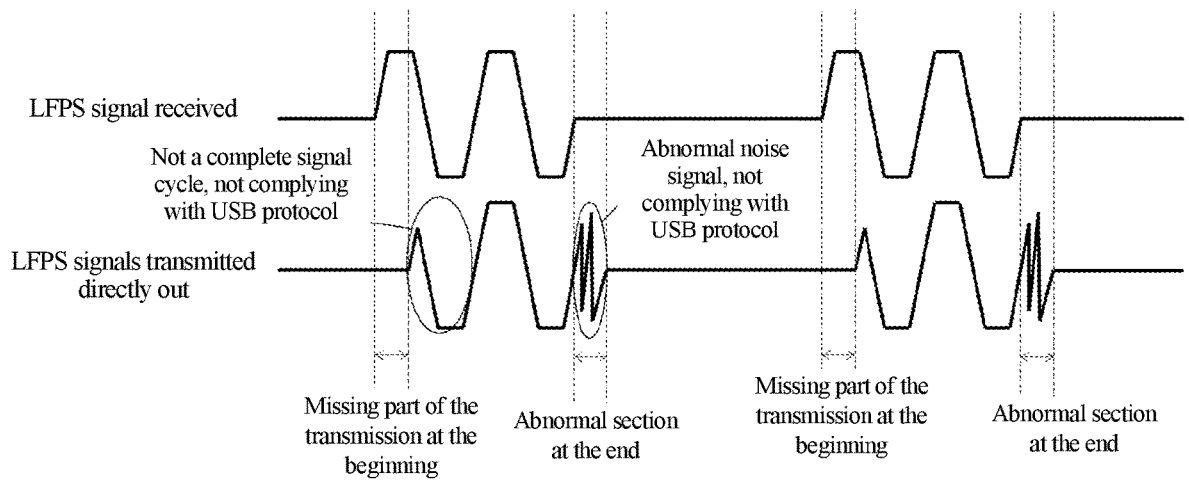
FIG. 1 illustrates a schematic diagram of LFPS signal reception and transmission waveform in the prior art.

The technical features to which the appended markings in the drawings refer respectively are:

1, Transmission unit; 11, Electrical input port; 12, LOSS detection module of transmission unit; 13, Control module of transmission unit; 14, Output circuit; 2, Receiving unit; 21, Input circuit; 22, LOSS detection module of receiving unit; 23, Control module of receiving unit; 24, Signal type detection module; 25, Proxy module; 26, Electrical output port.

DETAILED DESCRIPTION

The description set forth below, in connection with the appended drawings and implementations, is intended to provide further details of this application. It is to be understood that the detailed implementations described herein are only intended to explain this Application, rather than being a limitation thereof. It should also be noted that the attached drawings show only part, but not all, of the structure relevant to this Application for ease of description.

This Application is for: distinguishing the ping.LFPS signal from other signals in the LFPS signal for the feature that the ping.LFPS signal is of a very short duration and prone to missing detection and transmission to ensure that no ping.LFPS signal is missed; In addition, the signal link connection is detected by the receiving unit control module, while the circuit configuration modification and re-training operation are performed. This Application is applicable to a transmitting and receiving unit, an active transmission device and an active transmission system that supports signals of USB3.0 and above, including active optical cable, active copper cable and other various transmission situations This Application is of the definitions as followings:

In this Application, the active cable, in particular, in the form of the active optical cable is taken as an example, but the transmission medium of the active transmission system of this Application includes not only wired active optical cables and active copper cables and other wired active transmission media, but also wireless transmission modes, such as Bluetooth, WAPI and 2.4G, etc.

The connection between the transmission unit, the receiving unit and the transmission medium has a corresponding expression meanings based on different transmission media. As an example, if the transmission medium is a wired medium, the transmission unit or the receiving unit is connected to the wired transmission medium in a corresponding mode, e.g. by means of an optical cable or electrical connection to a fibre-optic or copper cable; if the transmission medium is wireless, it indicates that the transmission unit or the receiving unit transmits signals by means of wireless. All the above understanding falls within the scope of protection claimed by this Application.

Figure 2:
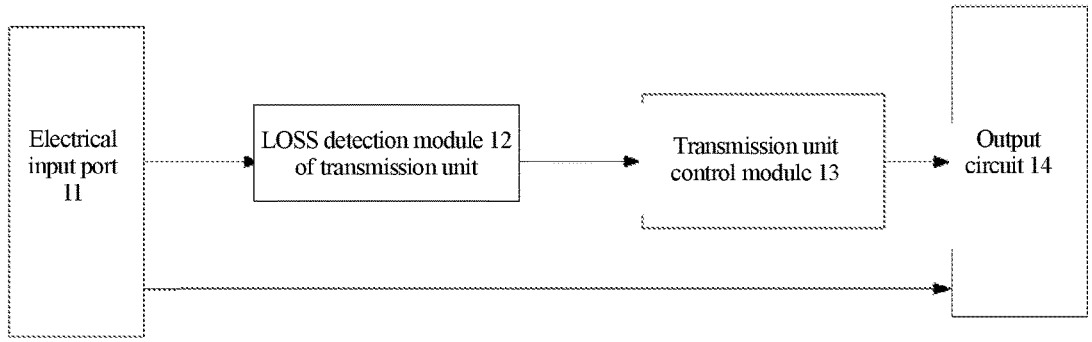
FIG. 2 illustrates a logic schematic diagram of a transmission unit of an active transmission device for signals of USB3.0 and above based on a specific implementation of this Application.
Figure 3:
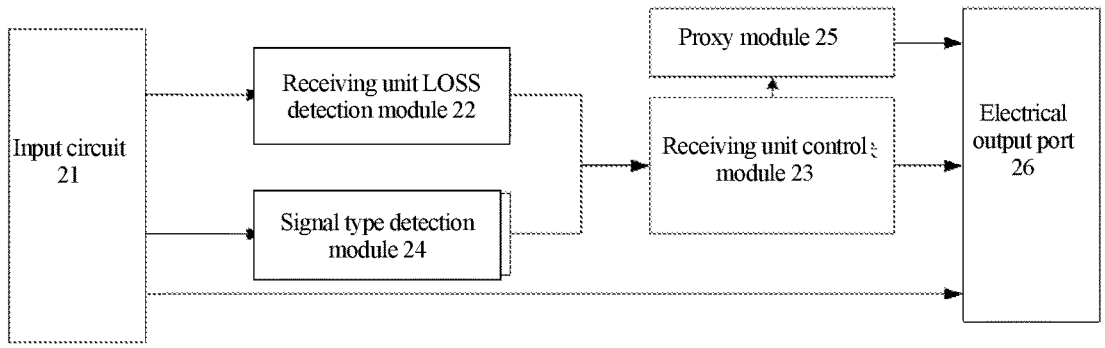
FIG. 3 illustrates a logic schematic diagram of a receiving unit of an active transmission device for signals of USB3.0 and above based on a specific implementation of this Application.

In particular, refer to FIGS. 2-3, for a logic schematic diagram of a transmission unit and a receiving unit of an active transmission device for signals of USB3.0 and above.

The examples set forth below are mainly illustrated by using wired media as an example.

An active transmission device that is suitable for signals of USB3.0 and above, comprising:

a transmission unit 1, a receiving unit 2 and a transmission medium that connects transmission unit 1 and receiving unit 2, e.g. a connection cable; and the transmission unit 1 includes an electrical input port 11, a transmission unit LOSS detecting module 12, a transmission unit controlling module 13, and an output circuit 14.

Wherein the electrical input port 11 is used to receive the input USB electric signal to be transmitted; and the transmission unit LOSS detection module 12 is connected to the above electrical input port 11, and is used for detecting whether there is an AC signal in the transmission path to be transmitted or the transmission path is in an idle state (i.e. no AC signal), and transmitting the result to the transmission unit control module 13; and the transmission unit control module 13 is configured for controlling the output of the output circuit and determining the state of the transmission unit according to the state of the electrical input port 11, wherein the transmission unit state includes outputting an AC signal component or maintaining only a DC component; and the output circuit 14 is connected to the transmission medium, and is used for driving an output signal according to the command of the transmission unit control module 13, maintaining the AC component of the output signal and transmitting a signal if there is an AC signal to be transmitted at the above electrical input port, or turning off the AC component of the output signal and maintaining only DC component if there is no AC signal input, that is, in an idle state; and the receiving unit 2 includes an input circuit 21, a receiving unit LOSS detecting module 22, a receiving unit controlling module 23, a signal type detecting module 24, a proxy module 25, and an electrical output port 26, and the input circuit 21 is connected to the other end of the transmission medium for receiving the signal output from the transmission unit 1; and the receiving unit LOSS detection module 22 is connected to the input circuit 21, and is used for detecting whether there is AC signal in the input circuit 21 or the input circuit 21 is in an idle state (i.e. no AC signal), and transmitting the result to the receiving unit control module 23; and the signal type detection module 24 is connected to the above input circuit 21, and is used for detecting whether the AC signal input by the above input circuit 21 is a high-speed signal, a ping.LFPS signal or some other LFPS signal when there is AC signal (i.e. an AC signal is detected), and transmitting the result to the Receiving unit control module 23.

The receiving unit control module 23 is configured for controlling the electrical output port and the proxy module based on the state of the input circuit 21, and determining the receiving unit state, wherein the receiving unit state includes Gen1 mode (or USB3.0 mode, with a maximum rate of 5 Gpbs), or Gen2 mode (with a maximum rate of 10 Gpbs) and other corresponding configurations, etc. In this case, the corresponding configurations indicate the equivalent configurations based on the Gen1 mode or the Gen2 mode.

The above proxy module 25 is connected to the above receiving unit control module 23, and is used for generating a low-speed signal complying with the USB protocol, which is used to generate a ping.LFPS signal or some other LFPS signals respectively according to an instruction when there is an LFPS signal connecting to the electrical output port 26 for signal output.

The electrical output port 26 is used for electrical signal output.

The transmission medium may be a connecting cable, including a cable or an optical cable, wherein the connecting cable is an optical cable, the output circuit 14 is an optical drive circuit, and the input circuit 21 is an optical receiving circuit.

If there is an AC signal in the input circuit, the signal type detection circuit 24 detects whether the signal coming from the input circuit is a ping.LFPS signal or some other LFPS signal or a high speed signal; wherein the way in which the ping.LFPS signal distinguishing from other LFPS signal and high speed signals is by the length of duration.

The detection time of the Loss detection module and the signal type detection module usually takes more than 100 ns based on the existing detection technology.

However, the duration of the ping.LFPS signal specified in the USB protocol is 40-200 ns, which causes many ping LFPS signal lost in the active cable solutions. While in the protocol of USB3.X, besides the ping.LFPS signal, the shortest LFPS signal is U1 exit, and the shortest time allowed for U1 exit is 300 ns. The distinguishing mode between ping.LFPS signal and other signals is the duration of AC signal, with no longer than 200 ns is ping.LFPS signal, and no shorter than 300 ns is other signals, and other LFPS signals besides the ping.LFPS signal.

Therefore, in this Application, for compatibility with protocols of USB3.0, USB3.1 and above, a time threshold is set to be 200-300 ns in the signal type detection module 24, with a preferred setting of 250 ns. The signal with a signal duration below the threshold time is considered to be a ping.LFPS signal, while the signals with a duration above the threshold time are considered to be other signals. Other signals include high speed signals and other LFPS signals other than ping.LFPS signals. The way to distinguish other signal is a high-speed signal or other LFPS signal other than the ping.LFPS signal is determined by sampling the input signal or other rate detection circuits.

Figure 4:
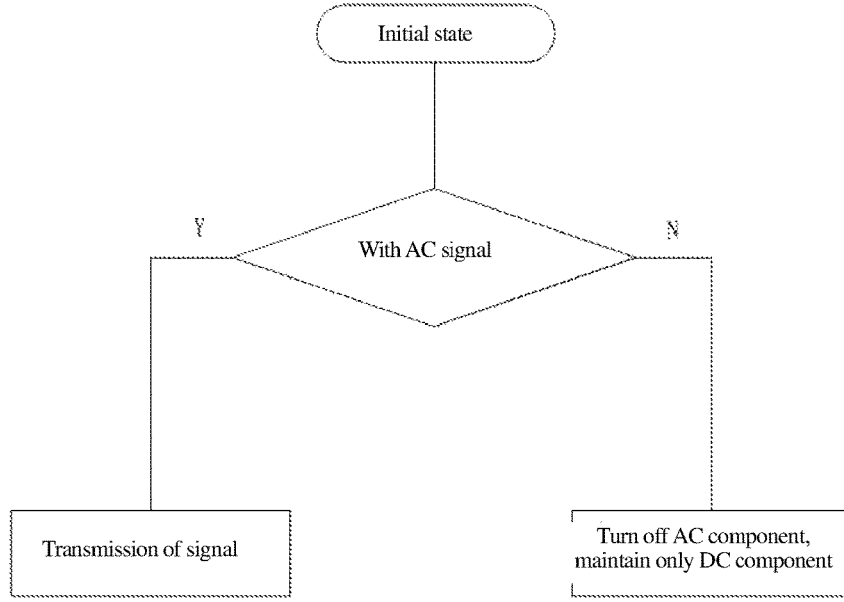
FIG. 4 illustrates an operation flow diagram of a transmission unit of an active transmission device for signals of USB3.0 and above based on the specific implementation of this Application.
Figure 5:
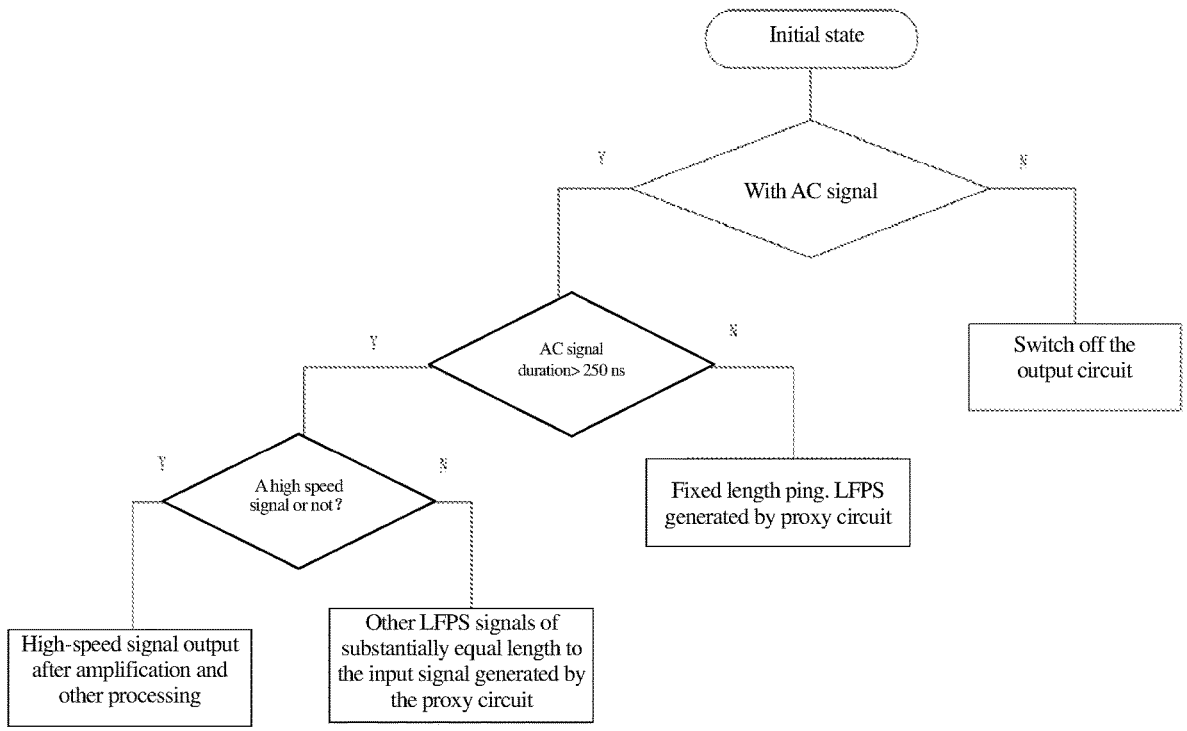
FIG. 5 illustrates an operation flow diagram of a receiving unit of an active transmission device for signals of USB3.0 and above based on a specific implementation of this Application.

Refer to FIG. 4 and FIG. 5, which illustrates the work flows of the transmission unit 1 and the receiving unit 2 respectively.

The workflow of the transmission unit is as follows:

the transmission unit LOSS detection module 12 detects whether there is an AC signal in the transmission path to be transmitted or the transmission path is in an idle state (i.e. no AC signal), and transmits the result to the transmission unit control module 13; and the transmission unit control module 13 is configured for controlling the output of the above output circuit and determining the state of the transmission unit according to the state of the above electrical input port 11, wherein the transmission unit state includes outputting an AC signal component or maintaining only a DC component; and the output circuit 14 drives the output signal according to the command of the transmission unit control module 13, maintaining the AC component of the output signal and transmits the signal if there is an AC signal to be transmitted at the electrical input port, or turning off the AC component of the output signal and maintaining only the DC component if there is no AC signal input, that is, in the idle state.

The workflow of the receiving unit is as follows:

the receiving unit Loss detection module 22 is connected to the input circuit for detecting whether there is an AC signal in the input circuit or the input circuit is in an idle state (no AC signal); and if there is an AC signal in the input circuit, the above signal type detection module 24 detects whether the signal that comes from the input circuit is a ping.LFPS signal, some other LFPS signal, or a high speed signal; and the receiving unit control module 23 is capable of controlling the operation mode of the electrical output port 26 and the proxy module according to the state of the input circuit 21, and determining the receiving unit state, wherein the receiving unit state includes Gen1 mode (or USB3.0 mode with the maximum rate of 5 Gpbs), or Gen2 mode (with the maximum rate of 10 Gpbs) and other corresponding configurations. In this case, the other corresponding configuration indicates the configuration that corresponds to the Gen1 mode or the Gen2 mode.

The electrical output port 26 outputs a signal or turns off the output according to the command of the receiving unit control module 23: if there is AC signal input in the input circuit 21, the electrical output port 26 is turned off; if there is a ping.LFPS input in the input circuit 21, the electrical output port 26 is connected to the proxy module 25 to output the ping.LFPS signal generated by the proxy module 25; if there is other LFPS signal inputs other than ping.LFPS in the input circuit 21, the electrical output port 26 is connected to the proxy module 25 to output other LFPS signals generated by the proxy module 25; if there is high-speed signal input in the input circuit 21, the electrical output port 26 directly outputs a high-speed signal subjected to amplification and other operations.

Furthermore, the ping.LFPS signal generated by the proxy module 25 is a ping.LFPS signal with a fixed length and complying with the USB protocol. For other LFPS signals, the length of which may contain some important information (e.g. Polling. LFPS and LBPM) that may affect the mutual response state of the host and device, other LFPS signals generated are LFPS signals with a burst duration (tBurst) and repetition time (tRepeat) of substantially equal to the length of the input signal.

The workflow of the transmission unit and the receiving unit continues in FIG. 4 and FIG. 5, that is, the workflow described above is continuously carried out to ensure the continuous judgment of the signals that continuously enter.

There is also an impedance (termination) matching circuit in the above electrical input port 11, and the above impedance matching circuit is able to provide a low resistance receiving unit termination (RRX-DC) complying with the requirements of USB protocol, or a high resistance receiving unit termination (ZRX-HIGH-IMP-DC-POS) complying with the requirements of USB protocol.

Therefore, this Application detects the Idle state in the transmission unit, and distinguishes the Idle state, the low-speed signal and the high-speed signal in the receiving unit, as well as re-generating the corresponding LFPS signal for output based on the detection result in the receiving unit, and also, the ping.LFPS signal in the LFPS signal is distinguished from other signals to ensure that the ping.LFPS signal is not missed due to the characteristic that the ping.LFPS signal is of a very short duration and easy to be miss-detected/miss-transmitted.

In addition, with the transmission protocol of USB entering USB3.X series, if the high-speed signal transmitted by the current system is 5 Gbps, i.e. Gen1 mode, the setting of transmission mode A is adopted; if the high-speed signal transmitted by the current system is 10 Gbps, i.e. Gen2 mode, then the setting of transmission mode B is adopted; wherein transmission mode A is of low power consumption and able to support 5 Gbps rate transmission; wherein transmission Mode B is of a more powerful setting and able to better support 10 Gbps transmission.

However, if the transmission mode established by the system has failed, that is, the link training has failed, and causing the system fails to establish a link (connection), or enter the USB2.0 mode, or decelerate to the Gen1 mode when it should have been Gen2 mode, then the active cable may initiate a re-training operation selectively to establish the desired transmission mode again.

Link training is a process specified by the USB protocol to ensure link connectivity. The uplink port and downlink port in the link can utilize the signals/information transmitted during the link training process to configure the respective transmission or receiving circuits to the optimal state.

The re-training operation in this Application refers to a salvage operation initiated when the link training fails.

In particular, the receiving unit control module parses the input signal upon the active transmission device is powered up, and if the USB3.0 signal or USB3.1/USB3.2 Gen1 signal is found transmitting in the current system, the receiving unit control module adopts the setting of transmission mode A to the receiving unit circuit to enter transmission mode A; and if the USB3.1/USB3.2 Gen2 signal is found transmitting in the current system, the receiving unit control module adopts the setting of transmission mode B to the receiving unit circuit to enter transmission mode B; and for a bidirectional USB signal active transmission system, a first plug and a second plug are provided, wherein the first plug is provided with a transmission unit and a receiving unit as described in this Application, and the second plug is also provided with a receiving unit and a transmission unit as described in this Application correspondingly, wherein a corresponding transmission medium is provided between the first plug and the second plug, and in order to make the overall signal transmission rate of the bidirectional USB signal active transmission system consistent, the receiving unit control module of a certain plug may notify the transmission unit control module of the same plug selectively after confirming the transmission rate of the current system, and the transmission unit control module may adopt the transmission unit circuit based on the setting of transmission mode A to enter the transmission mode A, or adopt the transmission unit circuit setting of the transmission mode B to enter the transmission mode B.

As an example, there is an information transmission interface between the transmission unit control module and the receiving unit control module located in the same plug, e.g. through variable value modification for the transfer of relevant information. In a specific implementation, the transmission unit control module and the receiving unit control module located in the same plug may be implemented by using the same MCU, or by two separate MCUs that are capable of communicating with each other.

Either the setting of the transmission mode A or the setting of the transmission mode B is able to be adjusted based on the TSEQ, TS1 and TS2 signals in the link training phase of the active transmission device, and the implementation method may include adopting an adaptive equalization circuit, adopting a clock recovery circuit that automatically detect and lock the rate, etc.

The receiving unit controls module judges whether the link training has failed, and if the link train has failed, the receiving unit control module initiates a re-training operation.

In particular, criterion for determining whether the link training has failed by the above receiving unit control module is that the USB3.X connection has not been established, or that it should have been Gen2 but decelerated to Gen1, etc.

Wherein, the above failure to establish the USB3.X connection may be determined and realized by one or more of the following: a LFPS signal is found to have exceeded its time and still not been successfully handshaken, and the transmission of TSEQ has not been performed all the time, or the transmission of the high-speed signal has ended abnormally by being shorter than the minimum transmission length specified in the USB protocol, etc.

Wherein the judgment should be made by using the information carried by the LFPS signal when a Gen2 is decelerated to a Gen1, or by performing rate detection on a high speed signal.

However, this Application is not limited thereto, and any other means of detecting a failure of link training are falling within the scope of this Application.

The receiving unit control module may initiate a re-training operation by one or more of the following:

the receiving unit control module transmits the re-training decision to the transmission unit control module, and the transmission unit control module is able to receive the re-training decision, thereby enabling the Rx impedance of the electrical input port (Rx termination) to be configured first as a high resistance receiving unit termination (ZRX-HIGH-IMP-DC-POS) complying with the requirements of the USB protocol, and then as a low-resistance receiving unit termination (RRX-DC) complying with the requirements of the USB protocol.

In this Application, the re-training decision received by the transmission unit control module may be derived from the re-training decision of the receiving unit control module of the same transmission data stream, that is, the re-training decision generated by the receiving unit control module located at the other end of the transmission medium, so as to ensure the consistency of the transmission mode of the entire data stream. In this case, the transmission unit control module and the receiving unit control module located at both ends of the transmission medium may transmit the control signal through additional data lines or data paths, e.g. a separate data line, or may occupy an existing data line to transmit the control signal by means of coding, etc.

Furthermore, the decision of re-training received by the above transmission unit control module in this Application may also be derived from the re-training decision of the receiving unit control module of other transmission data streams located at the same end. As an example, a first plug and a second plug are provided for a bidirectional USB signal active transmission system, wherein the first plug has the transmission unit and the receiving unit as described in this Application, and the second plug also has the corresponding receiving unit and transmission unit as described in this Application, and the receiving unit control module of a certain plug is able to notify the relevant re-training information selectively to the transmission unit control module of the same plug after confirming the transmission rate of the current system, enabling the overall signal transmission rate of the bidirectional active USB signal transmission system to be consistent. The transmission unit control module of the same plug can select whether or not to operate re-training based on this information by configuring the Rx impedance of the electrical input port first as a high resistance receiving unit termination (ZRX-HIGH-IMP-DC-POS) complying with the requirements of the USB protocol, and then as a low resistance receiving unit termination (RRX-DC) complying with the requirements of the USB protocol.

Wherein the receiving unit control module controls the power supply for the power cable (VBUS) of the plug where the unit is located to power off and then power on again; and the receiving unit control module resets the first plug and the second plug of the active transmission device. The first plug and the second plug are the two ends of the active transmission device. Illustratively, the first plug may be the host end and the second plug may be the device end.

In particular, the methods used by the receiving unit control module to reset the first and second plugs of the active transmission device include: performing the reset operation by controlling the power supply, performing the reset operation by resetting the reset pin, performing the reset operation by writing a register, or performing the reset operation by reloading firmwares, etc.

Wherein, the circuits to be reset in the reset operation of the first plug and the second plug of the active transmission device by the receiving unit control module may be all the circuits of the first plug and the second plug, or part of the related circuits of the first plug and the second plug.

Implementation Example 1

Referring to FIG. 2, which illustrates a transmission unit 1 for signals of USB3.0 and above, connected to a transmission medium for transmitting signals of USB3.0 and above, comprising:

an electrical input port 11, a transmission unit LOSS detection module 12, a transmission unit control module 13, and an output circuit 14, wherein the electrical input port 11 is used to receive the input USB electric signal to be transmitted; and the transmission unit LOSS detection module 12 is connected to the electrical input port 11 for detecting whether there is an AC signal in the transmission path to be transmitted or the transmission path is in an idle state (i.e. no AC signal), and transmitting the result to the transmission unit control module 13; and the transmission unit control module 13 is configured for controlling the output of the output circuit and determining the state of the transmission unit according to the state of the electrical input port 11, wherein the transmission unit state includes outputting an AC signal component or maintaining only a DC component; and the output circuit 14 is connected to the transmission medium for driving an output signal according to the command of the transmission unit control module 13, maintaining the AC component of the output signal and transmitting a signal if there is an AC signal to be transmitted at the electrical input port, or turning off the AC component of the output signal and maintaining only the DC component if there is no AC signal input, that is, in an idle state.

Referring to FIG. 4, which illustrates a workflow of the transmission unit 1.

The workflow of the transmission unit is as follows:

the transmission unit LOSS detection module 12 detects whether there is an AC signal in the transmission path to be transmitted or the transmission path is in an idle state (i.e. no AC signal), and transmits the result to the transmission unit control module 13; and the transmission unit control module 13 is configured for controlling the output of the output circuit and determining the state of the transmission unit according to the state of the electrical input port 11, wherein the transmission unit state includes outputting an AC signal component or maintaining only a DC component; and the output circuit 14 drives the output signal according to the command of the transmission unit control module 13, maintaining the AC component of the output signal and transmitting the signal if there is an AC signal to be transmitted at the above electrical input port, or turning off the AC component of the output signal and maintaining only the DC component if there is no AC signal input, that is, in the idle state.

There is also an impedance matching circuit in the electrical input port 11, wherein the impedance matching circuit is able to provide a low resistance receiving unit termination (RRX-DC) complying with the requirements of USB protocol, or a high resistance receiving unit termination (ZRX-HIGH-IMP-DC-POS) complying with the requirements of USB protocol.

For re-training operation, the transmission unit control module is capable of receiving the re-training decision from the receiving unit the control module, enabling the transmission unit control module to configure the Rx impedance of the above electrical input port first as a high-resistance receiving unit termination (ZRX-HIGH-IMP-DC-POS) complying with the requirements of USB protocol, and then as a low-resistance receiving unit termination (RRX-DC) complying with requirements of USB protocol.

As stated above, the re-training decision may be from the receiving unit control module of the same transmission data stream or the re-training decision of the receiving unit control module of another transport stream located at the same end.

The receiving unit control module notifies the transmission unit control module of the transmission data stream located at the same unit to perform re-training to ensure the transmission mode of the transmission data stream.

The receiving unit control module notifies the neighboring transmission unit control module at the same end for re-training, ensuring the transmission mode of the entire system as a whole, and is simpler in structure, and no additional data line or special code transmission involved.

Implementation Example 2

Referring to FIG. 3, which illustrates a receiving unit 2 for signals of USB 3.0 and above, connected to a transmission medium for receiving signals of USB 3.0 and above, comprising:

an input circuit 21, a receiving unit LOSS detection module 22, a receiving unit control module 23, a signal type detection module 24, a proxy module 25, an electric output port 26, wherein the input circuit 21 is connected to the other end of the above transmission medium, and is used for receiving the signal output from the above transmission unit 1; and the receiving unit LOSS detection module 22 is connected with the above input circuit 21 to detect whether there is an AC signal in the input circuit 21 or the input circuit 21 is in an idle state (i.e. no AC signal), and to transmit the result to the above receiving unit control module 23; and the signal type detection module 24 is connected to input circuit 21, and is used for detecting whether the AC signal input by the input circuit 21 is a high-speed signal, a ping.LFPS signal or some other LFPS signal when there is AC signal (e.g. an AC signal is detected), and transmitting the result to the receiving unit control module 23; and the above receiving unit control module 23 is configured for controlling the electric output port 26 and the operating mode of the proxy module based on the state of the input circuit 21, and determining the receiving unit state, wherein the receiving unit state includes Gen1 mode (or USB3.0 mode with the maximum rate of 5 Gpbs), or Gen2 mode (with the maximum rate of 10 Gpbs) and other corresponding configurations. In this case, the other corresponding configurations indicate the configuration corresponding to the Gen1 mode or the Gen2 mode.

The proxy module 25 is connected to the receiving unit control module 23 to generate a low-speed signal complying with the USB protocol, which is used for generating a ping.LFPS signal or other LFPS signals respectively according to an instruction when there is an LFPS signal, and connecting to the above electric output port 26 for signal output.

The above electrical output port 26 is used for electrical signal output.

The workflow of the receiving unit is as follows:

The receiving unit Loss detection module 22 is connected to the input circuit, and is used for detecting whether there is an AC signal in the input circuit or the input circuit is in an idle state (no AC signal); and if there is AC signal in the input circuit, the signal type detection module 24 continues to detect whether the signal coming from the input circuit is a ping.LFPS signal, some other LFPS signal, or a high speed signal; and the receiving unit control module 23 is configured for controlling the electric output port 26 and the operating mode of the proxy module based on the state of the input circuit 21, and determining the receiving unit state, wherein the receiving unit state includes Gen1 mode (or USB3.0 mode with the maximum rate of 5 Gpbs), or Gen2 mode (with the maximum rate of 10 Gpbs) and other corresponding configurations. In this case, the other corresponding configurations indicate the configuration corresponding to the Gen1 mode or the Gen2 mode.

In this Application, for compatibility with the protocols of USB3.0, USB3.1 and above, a time threshold of 200-300 ns is set in the signal type detection module 24, with a preferred setting of 250 ns. The signals with a signal duration below the threshold time are considered as a ping.LFPS signal, and the signals with a signal duration above the threshold time are considered as other signal. Other signals include high speed signals, as well as other LFPS signals besides ping.LFPS signals. Distinguishing whether other signals are high-speed signals or other LFPS signals other than the ping.LFPS signal can be judged by sampling the input signal.

Referring to FIG. 5, which illustrates a workflow of the receiving unit 2.

The workflow of the receiving unit is as follows:

The receiving unit Loss detection module 22 is connected to the input circuit, and is used for detecting whether there is an AC signal in the input circuit or the input circuit is in an idle state (no AC signal); and if there is AC signal in the input circuit, the signal type detection module 24 continues to detect whether the signal coming from the input circuit is a ping.LFPS signal, other LFPS signal, or a high speed signal; and the receiving unit control module 23 is capable of controlling the electrical output port 26 and the operating mode of the proxy module based on the state of the input circuit, and determining the receiving unit state, wherein the receiving unit state includes Gen1 mode (or USB3.0 mode with the maximum rate of 5 Gpbs), or Gen2 mode (with the maximum rate of 10 Gpbs) and other corresponding configurations. In this case, the other corresponding configurations indicate the configurations that correspond to the Gen1 mode or the Gen2 mode.

The electrical output port 26 is used for outputting a signal or turning off the output according to the command of the receiving unit control module 23: if there is AC signal input in the input circuit 21, the electrical output port 26 is turned off; if there is a ping.LFPS input in the input circuit 21, the electrical output port 26 is connected to the proxy module 25 to output the ping.LFPS signal generated by the proxy module 25; if there is other LFPS signal inputs besides ping.LFPS in the input circuit 21, the electrical output port 26 is connected to the proxy module 25 to output other LFPS signals generated by the proxy module 25; if there is high-speed signal input in the input circuit 21, the electrical output port 26 directly outputs a high-speed signal subjected to an operation such as amplification.

Furthermore, the ping.LFPS signal generated by the a proxy module 25 is a ping.LFPS signal with a fixed length and complying with the USB protocol. For other LFPS signals, the length of which may contain some important information (e.g. Polling. LFPS and LBPM) that may affect the mutual response state of the host and device, other LFPS signals generated are LFPS signals with a burst duration (tBurst) and repetition time (tRepeat) of substantially equal to the length of the input signal.

With USB transmission protocol entering USB3. X series, if the high-speed signal transmitted by the current system is 5 Gbps, i.e. Gen1 mode, then the setting of transmission mode A is adopted; if the high-speed signal transmitted by the current system is 10 Gbps, i.e. Gen2 mode, then the setting of transmission mode B is adopted; wherein transmission mode A is of low power consumption and able to support 5 Gbps rate transmission; wherein transmission Mode B is of powerful setting and able to better support 10 Gbps transmission.

However, if the transmission mode established by the system has failed, that is, the link training has failed, and causing the system has failed to establish a link (connection), or enter the USB2.0 mode, or decelerate to the Gen1 mode when it should have been Gen2 mode, then the active cable may initiate a re-training operation selectively to establish the desired transmission mode again.

Link training is a process specified by the USB protocol to ensure link connectivity. The uplink port and downlink port in the link may utilize the signals/information transmitted during the link training process to configure the respective transmission or receiving circuits to the optimal state.

The receiving unit control module parses the input signal upon the active transmission device is powered up, and if the USB3.0 signal or USB3.1/USB3.2 Gen1 signal is found transmitting in the current system, the receiving unit control module adopts the setting of transmission mode A to the receiving unit circuit to enter the transmission mode A; and if the USB3.1/USB3.2 Gen2 signal is found transmitting in the current system, then the receiving unit control module adopts the setting of transmission mode B to the receiving unit circuit to enter the transmission mode B.

The receiving unit control module judges whether the link training has failed, and if the link training has failed, the receiving unit control module may initiate a re-training operation.

In particular, criterion for determining whether the link training has failed by the receiving unit control module is that USB3.X connection has not been established, or that it should have been Gen2 but decelerated to Gen1, etc.

Wherein, the failure to establish the USB3.X connection may be determined and realized by one or more of the following: a LFPS signal is found to have exceeded its time and still not been successfully handshaken, and the transmission of TSEQ has not been performed all the time, or the transmission of the high-speed signal has ended abnormally by being shorter than the minimum transmission length specified in the USB protocol, etc.

Wherein, the judgment should be made by using the information carried by the LFPS signal when a Gen2 is decelerated to a Gen1, or by performing rate detection on a high speed signal.

However, this Application is not limited thereto, and any other methods that can find and judge the failure of link training are within the scope of this Application.

The receiving unit control module may initiate a re-training operation by one or more of the following:

the receiving unit control module transmits the decision of re-training to the transmission unit control module, enabling the transmission unit control module to configure the Rx impedance of the electrical input port first as a high-resistance receiving unit termination (ZRX-HIGH-IMP-DC-POS) complying with requirements USB protocol, and then as a low-resistance receiving unit termination (RRX-DC) complying with the requirements of USB protocol; and as mentioned above, the transmission unit control module notified by the receiving unit control module may be a transmission unit control module of the same transmission data stream or a transmission unit control module of other transmission data streams located at the same end.

The receiving unit control module notifies the transmission unit control module of the transmission data stream to carry out the operation of re-training, so as to ensure the transmission mode of the transmission data stream.

The receiving unit control module notifies the neighboring transmission unit control module at the same end for re-training, ensuring the transmission mode of the entire system as a whole, and is simpler in structure, and no additional data line or special code transmission involved.

The receiving unit control module controls the power supply for the power cable (VBUS) of the plug where the unit is located to power off and then power on again; and the receiving unit control module resets the first plug and/or the second plug of the active transmission device where it is located. The first plug and the second plug are the two ends of the active transmission device. As an illustration, the first plug may be the host end and the second plug may be the device end.

In particular, the methods used by the receiving unit control module to reset the first and second plugs of the active transmission device include: performing the reset operation by controlling the power supply, performing the reset operation by resetting the reset pin, performing the reset operation by writing a register, performing the reset operation or by reloading firmwares, etc.

Wherein, the circuits to be reset in the reset operation of the first plug and the second plug of the active transmission device by the receiving unit control module may be all the circuits of the first plug and the second plug, or part of the related circuits of the first plug and the second plug.

Implementation Example 3

This Application discloses an active transmission device applicable for signals of USB3.0 and the above, including a transmission unit as described above and in implementation 1, a receiving unit as described above and in implementation 2, and a transmission medium connecting to the transmission unit 1 and the receiving unit 2, e.g. a connecting cable.

Implementation Example 4

This Application further discloses a bidirectional active USB signal transmission system, wherein a first plug and a second plug are provided, wherein the first plug is provided with a transmission unit and a receiving unit as described in this Application, and the second plug is also provided with a receiving unit and a transmission unit as described in this Application correspondingly, and a corresponding transmission medium is provided between the first plug and the second plug, enabling both the first plug and the second plug to have the functions of transmitting and receiving. That is, it is equivalent to having two active transmission systems between the above first plug and second plug for USB3.0 signals and above as previously described.

Optionally, the transmission unit control module and the receiving unit control module located in the same plug can be realized by the same MCU, or by two separate MCUs that are capable of communicating with each other.

In re-training, the receiving unit control module of a certain plug is able to notify the related re-training information selectively to the transmission unit control module of the same plug, and the transmission unit control module of the same plug is able to select whether to perform re-training based on the information through configuring the Rx termination of the electrical input port first as a high resistance receiving unit termination (ZRX-HIGH-IMP-DC-POS) complying with requirements of USB protocol, and then as a low resistance receiving unit termination (RRX-DC) complying with the requirements of USB protocol.

Furthermore, to make the overall signal transmission rate of the bidirectional USB signal active transmission system consistent, the receiving unit control module of a certain plug is able to notify the relevant information to the transmission unit control module of the same plug selectively upon confirming the transmission rate of the current system, and the transmission unit control module may, based on this information, adopt the setting of transmission mode A to enter into transmission mode A, or adopt the setting of transmission mode B to enter into transmission mode B.

As an example, there is an information transmission interface between the transmission unit control module and the receiving unit control module located in the same plug, e.g. through variable value modification for the transfer of relevant information. In a specific implementation, the transmission unit control module and the receiving unit control module located in the same plug may be implemented by using the same MCU, or by two separate MCUs that are capable of communicating with each other.

In summary, this Application has the following advantages:

1. It is applicable for the transmission of LFPS signals in USB3.X signal transmission, in particular, for the optical transmission of LFPS signals, to avoid the loss of control signal transmission in USB signal transmission and mis-transmission of control signal information in the transmission of higher version of USB signals;

2. The detection threshold set to address the problem that the ping.LFPS signal is easy to lose, and distinguish the ping.LFPS signal in the LFPS signal from other LFPS signals, so that the ping.LFPS signal is not to be missed;

3. The proxy module is optimized for USB3. X signals, and generates proxy signals for the ping.LFPS signals and other LFPS signals respectively;

4. Link training is supported and can be managed to improve the success rate of high-speed signal transmission by modifying circuit configuration and re-training.

Apparently, it should be understood to those skilled in the art that the above described units or steps of this Application may be realized with a generic computing device, and they may be grouped together on a single computing device, or optionally, they may be realized with program code executable by a computer device, allowing them to be stored in a storage device to be executed by the computing device, or they may be realized by manufacturing separately into single integrated circuit modules, or by manufacturing multiple modules or steps of them as a single integrated circuit module. Therefore, this Application is not limited to any particular combination of hardware and software.

The detailed description set forth above, in connection with the specific preferred implementations of this application, is not intended to conclude that the specific implementations of this Application are limited thereto, and that there are a number of simple derivations or substitutions that could be made by a person of ordinary skill in the art to which this application belongs, without departing from the idea of this Application, all of which should be considered as falling within the scope of protection of this Application as determined by the submitted claims.

What is claimed is:

1. A transmission unit applicable to a USB signal, connected with a first end of a transmission medium, for transmitting signals of USB3.0 and the above, wherein a second end of the transmission medium is used for connecting with a receiving unit, and the transmission unit cooperates with the receiving unit for the transmission of USB signals, comprising:

an electrical input port, a transmission unit LOSS detection module, a transmission unit control module, and an output circuit, wherein the electrical input port is used to receive the input USB electric signal to be transmitted;

the transmission unit LOSS detection module is connected to the electrical input port, and used for detecting whether an AC signal to be transmitted exists in the transmission path, or in an idle state, and transmitting detection result to the transmission unit control module; and the transmission unit control module is used for controlling the output of the output circuit according to the state of the electrical input port and determining the state of the transmission unit, wherein the above transmission unit state includes outputting an AC signal component or maintaining a DC component only; and the output circuit, connected with the transmission medium, is used for driving an output signal according to a command of the transmission unit control module, maintaining the AC component of the output signal and transmitting the output signal if there is an AC signal to be transmitted in the electrical input port, or turning off the AC component of the output signal and maintaining only the DC component if there is no AC signal input, that is, in the idle state; and the electrical input port further having an impedance matching circuit providing a low resistance receiving unit complying with USB protocol requirements or providing a high resistance receiving unit complying with USB protocol requirements; and the transmission unit control module is capable of receiving a re-training decision from a receiving unit control module in the receiving unit at the second end of the transmission medium, or from a receiving unit control module of a second receiving unit, used for transmitting other data streams, at the same end where the transmission unit is located, and causing the transmission unit control module to configure the Rx impedance of the electrical input port first as a high resistance receiving unit complying with the requirements of the USB protocol, and then as a low-impedance receiving unit complying with the requirements of the USB protocol.

2. A receiving unit applicable to a USB signal, connected with a transmission medium, for receiving signals of USB 3.0 and the above, wherein the other end of the transmission medium is used for connecting with a transmission unit, and the receiving unit cooperates with the transmission unit for transmission of USB signals, comprising:

an input circuit, a receiving unit LOSS detection module, a receiving unit control module, a signal type detection module, a proxy module, an electrical output port, wherein the input circuit is connected to the other end of the transmission medium, and used for receiving a signal output from an output circuit of the transmission unit; and the receiving unit LOSS detection module is connected with the input circuit and used for detecting whether there is an AC signal in the input circuit or the input circuit is in an idle state, and transmitting the detecting result to the receiving unit control module; and the signal type detection module is connected with the input circuit to detect whether the AC signal input by the input circuit is a high speed signal, a ping.LFPS signal or some other LFPS signal when there is the AC signal, and transmitting the detecting result to the receiving unit control module; and the receiving unit control module is used for controlling the operating mode of the electrical output port and the proxy module according to the state of the input circuit, determining the state of the receiving unit, wherein the state of the receiving unit includes Gen1 mode, and Gen2 mode, and wherein a highest rate for the Gen1 mode signal is 5 Gbps, and the highest rate for the Gen2 mode signal is 10 Gbps; and the proxy module is connected with the receiving unit control module, able to generate a low speed signal complying with a USB protocol, and is used for generating a ping.LFPS signal or other LFPS signals respectively according to an instruction when there is an LFPS signal, and connected to the electrical output port for signal output; and the electrical output port is used for electrical signal output; and the receiving unit control module determines whether a link training has failed, and the receiving unit control module initiates a retraining operation if the link training has failed.

3. The receiving unit of claim 2, wherein the workflow of the receiving unit is as follows:

the receiving unit LOSS detection module is connected to the input circuit to detect whether there is an AC signal in the input circuit or the input circuit is in an idle state; and the signal type detection module continuedly detects whether the signal coming from the input circuit is the ping.LFPS signal, some other LFPS signals, or the high speed signal if there is AC signal in the input circuit; and the receiving unit control module is used to control the electrical output port and operating modes of the proxy module and determine the state of the receiving unit according to the state of the input circuit, wherein the receiving unit state includes Gen1 mode, Gen2 mode and other corresponding configurations; and the electrical output port is used for outputting the signals or turning off the output according to the command of the of the receiving unit control module: if there is no AC signal input in the input circuit, the electrical output port is turned off; if there is the ping.LFPS input to the input circuit, the electrical output port is connected to the proxy module to output the ping.LFPS signal generated by the proxy module; if there is other LFPS signal other than ping.LFPS input to the input circuit, the electrical output port is connected to the proxy module to output other LFPS signals generated by the proxy module; if there is the high-speed signal input to the input circuit, the electrical output port directly outputs the high-speed signal after amplification and other operations.

4. The receiving unit of claim 3, wherein in the signal type detection module, a time threshold value is set as 200-300 ns, and signals with a signal duration below the threshold time are considered to be ping.LFPS signals, and signals with a signal duration above the threshold time are considered to be other signals, and other signals including high-speed signals and other LFPS signals other than ping.LFPS signals.

5. The receiving unit of claim 4, wherein the time threshold is 250 ns.

6. The receiving unit of claim 2, wherein the ping.LFPS signal generated by the proxy module is a ping.LFPS signal with a fixed length and complying with the USB protocol, and other LFPS signals are LFPS signal with a burst duration and repetition time of approximately the same length as the input signal.

7. The receiving unit of claim 3, wherein when an active transmission device is powered on, the receiving unit control module analyzes the input signal, and if the signal transmitted by the current system is found to be USB3.0 signal or USB3.1/USB3.2 Gen1 signal, the receiving unit control module adopts the setting of transmission mode A for the receiving unit circuit and then enters the transmission mode A; if the signal transmitted by the current system is found to be USB3.1/USB3.2 Gen2 signal, then the receiving unit control module adopts the setting of transmission mode B for the receiving unit circuit and then enters the transmission mode B.

8. The receiving unit of claim 2, wherein:
the above receiving unit control module determines whether the link training has failed, that is, USB3.X connection has not been established, or that the receiving unit state should be Gen2 mode but is decelerated to Gen1 mode; and
the receiving unit control module initiates the retraining operation to be implemented in one or more of the following:
the receiving unit control module transmits a retraining decision to the transmission unit control module of the transmission unit used for connection at the other end of the transmission medium, or to a transmission unit control module that transmits other data stream located at the same end with the receiving unit, and causing the transmission unit control module to configure the Rx impedance of the electrical input port first as a high resistance receiving unit complying with the USB protocol requirements, and then as a low resistance receiving unit complying with the USB protocol requirements; or
the receiving unit control module supplies power to power off and then power on a device through the power cord of the plug where the receiving unit control module is located; or
a reset operation is applied to a first plug and/or a second plug of the active transmission device where the receiving unit control module locates.

9. The receiving unit of claim 8, wherein:
that the USB3.X connection has not been established is determined by at least one of the following:
there is no successful handshake within a pre-set period of time with the LFPS signal detected, there is no transmission of TSEQ, or the transmission of the high-speed signal has ended abnormally with a transmission length being shorter than the minimum transmission length specified in the USB protocol; and
that the receiving unit state should be Gen2 mode but is decelerated to Gen1 mode is determined by using the information carried by the LFPS signal, or by performing rate detection on a high speed signal.

10. The receiving unit of claim 8, wherein:
the method for the reset operation includes performing a reset operation by controlling a power supply, performing a reset operation through a reset pin, performing a reset operation by writing a register, or performing a reset operation by reloading firmware; and
the circuits to be reset in the reset operation of the first and second plugs of the active transmission device in which the receiving unit control module is located are at least parts of the circuits of the first and second plugs.

11. A bidirectional USB signal active transmission system, comprising:
a first plug and a second plug,
wherein the first plug has a transmission unit applicable to a USB signal, connected with a first end of a transmission medium, for transmitting signals of USB3.0 and the above, wherein a second end of the transmission medium is used for connecting with a receiving unit, and the transmission unit cooperates with the receiving unit for the transmission of USB signals, the transmission unit comprising:
an electrical input port, a transmission unit LOSS detection module, a transmission unit control module, and an output circuit,
wherein the electrical input port is used to receive the input USB electric signal to be transmitted;
the transmission unit LOSS detection module is connected to the electrical input port, and used for detecting whether an AC signal to be transmitted exists in the transmission path, or in an idle state, and transmitting detection result to the transmission unit control module; and
the transmission unit control module is used for controlling the output of the output circuit according to the state of the electrical input port and determining the state of the transmission unit, wherein the above transmission unit state includes outputting an AC signal component or maintaining a DC component only; and
the output circuit, connected with the transmission medium, is used for driving an output signal according to a command of the transmission unit control module, maintaining the AC component of the output signal and transmitting the output signal if there is an AC signal to be transmitted in the electrical input port, or turning off the AC component of the output signal and maintaining only the DC component if there is no AC signal input, that is, in the idle state; and
the electrical input port further having an impedance matching circuit providing a low resistance receiving unit complying with USB protocol requirements or providing a high resistance receiving unit complying with USB protocol requirements; and the transmission unit control module is capable of receiving a re-training decision from a receiving unit control module in the receiving unit at the second end of the transmission medium, or from a receiving unit control module of a second receiving unit, used for transmitting other data streams, at the same end where the transmission unit is located, and causing the transmission unit control module to configure the Rx impedance of the electrical input port first as a high resistance receiving unit complying with the requirements of the USB protocol, and then as a low-impedance receiving unit complying with the requirements of the USB protocol;

wherein the second plug correspondingly has a receiving unit applicable to USB signal, connected with the transmission medium, for receiving signals of USB3.0 and the above, wherein the other end of the transmission medium is used for connecting with a transmission unit, and the receiving unit cooperates with the transmission unit for transmission of USB signals, the receiving unit comprising:

an input circuit, a receiving unit LOSS detection module, a receiving unit control module, a signal type detection module, a proxy module, an electric output port, wherein the input circuit is connected to the other end of the transmission medium, and used for receiving a signal output from an output circuit of the transmission unit; and the receiving unit LOSS detection module is connected with the input circuit and used for detecting whether there is an AC signal in the input circuit or the input circuit is in the idle state, and transmitting the detecting result to the receiving unit control module; and the signal type detection module is connected with the input circuit to detect whether the AC signal input by the input circuit is a high speed signal, a ping.LFPS signal or some other LFPS signal when there is the AC signal, and transmitting the detecting result to the receiving unit control module; and the receiving unit control module is used for controlling the operating mode of the electrical output port and the proxy module according to the state of the input circuit, determining the state of the receiving unit, wherein the state of the receiving unit includes Gen1 mode, Gen2 mode and some other corresponding configurations, and wherein a highest rate for the Gen1 mode signal is 5 Gbps, and the highest rate for the Gen2 mode signal is 10 Gbps; and the proxy module is connected with the receiving unit control module, able to generate a low speed signal complying with the USB protocol, and is used for generating a ping.LFPS signal or other LFPS signals respectively according to an instruction when there is an LFPS signal, and connected to the electrical output port for signal output; and the electrical output port is used for electrical signal output; and the receiving unit control module determines whether the link training has failed, and the receiving unit control module initiates a retraining operation if the link training has failed;

the transmission medium is provided between the first plug and the second plug such that both the first plug and the second plug both have functions of transmitting and receiving.

12. The active transmission system of claim 11, wherein the transmission unit control module and the receiving unit control module located in the same plug are realized by a same MicroControl Unit (MCU), or by two separate MCUs that are capable of communicating with each other.

13. The active transmission system of claim 11, wherein the receiving unit control module of a plug selectively notifies the related re-training information to the transmission unit control module locating on the same plug during re-training, and the transmission unit control module of the same plug can choose, based on this information, whether to retrain and to configure the Rx impedance of the electrical input port first as a high resistance receiving unit complying with the requirement of the USB protocol, and then as a low resistance receiving unit complying with the requirement of the USB protocol.

14. The active transmission system of claim 11, wherein the receiving unit control module of a plug selectively notifies relevant information to the transmission unit control module locating on the same plug, after confirming the transmission rate of the current system, and the transmission unit control module applies the setting of transmission mode A to the transmission unit circuit to enter the transmission mode A or applies the setting of transmission mode B to the transmission unit circuit to enter the transmission mode B according to this information.

* * * * *